(12) United States Patent
Rabiea

(10) Patent No.: US 11,440,267 B2
(45) Date of Patent: Sep. 13, 2022

(54) METHOD OF MANUFACTURING HEADERLESS PRODUCE BAGS WITH INCREASED ADHESION

(71) Applicant: NEW YORK PACKAGING II, New Hyde Park, NY (US)

(72) Inventor: Jeffrey Rabiea, New Hyde Park, NY (US)

(73) Assignee: New York Packaging II, New Hyde Park, NY (US)

(*) Notice: Subject to any disclaimer, the term of this patent is extended or adjusted under 35 U.S.C. 154(b) by 0 days.

(21) Appl. No.: 16/695,174

(22) Filed: Nov. 25, 2019

(65) Prior Publication Data

US 2020/0094485 A1 Mar. 26, 2020

Related U.S. Application Data

(62) Division of application No. 14/872,871, filed on Oct. 1, 2015, now Pat. No. 10,513,078.

(51) Int. Cl.
| | |
|---|---|
| *B65D 85/62* | (2006.01) |
| *B29C 65/00* | (2006.01) |
| *B31B 70/98* | (2017.01) |
| *B65D 33/00* | (2006.01) |
| *B31B 70/14* | (2017.01) |
| *B31B 70/64* | (2017.01) |
| *B29C 65/18* | (2006.01) |
| *B65D 30/20* | (2006.01) |

(Continued)

(52) U.S. Cl.
CPC ............ *B29C 65/008* (2013.01); *B29C 65/18* (2013.01); *B29C 66/41* (2013.01); *B31B 70/142* (2017.08); *B31B 70/642* (2017.08); *B31B 70/984* (2017.08); *B31B 70/988* (2017.08); *B65D 31/10* (2013.01); *B65D 33/001* (2013.01); *B65D 33/007* (2013.01); *B65D 33/14* (2013.01); *B29K 2023/06* (2013.01); *B29K 2023/10* (2013.01); *B29L 2031/7129* (2013.01); *B31B 2155/002* (2017.08); *B31B 2160/10* (2017.08)

(58) Field of Classification Search
CPC .... B65D 33/001; B65D 33/007; B65D 33/14; B65D 31/10
USPC ........................................................ 206/554
See application file for complete search history.

(56) References Cited

U.S. PATENT DOCUMENTS

| | | | | |
|---|---|---|---|---|
| 4,487,318 A | * | 12/1984 | Roen .................. | B65D 83/0805 206/494 |
| 4,989,732 A | * | 2/1991 | Smith .................. | B65D 33/001 206/554 |

(Continued)

*Primary Examiner* — Luan K Bui
(74) *Attorney, Agent, or Firm* — Richard A. Castellano; Castellano

(57) ABSTRACT

During the manufacturing process the exterior surface of one or both of the sheets of plastic film which form the bags is treated with low temperature corona discharge plasma to raise the level of surface charge magnitude to at least 43 Dyne to increase the adhesion force between the bags. A recess is formed in each of the bags to further increase the adhesion. The increased adhesion causes the mouth of one bag to automatically open as the adjacent bag is removed from the rack. The recess is formed at the same time openings are created in the bags to accept the support rods of a dispensing rack. The bags can have simple edge sides or side gussets and may be provided in a package including a pouch which receives and supports the lower portions of the bags.

5 Claims, 6 Drawing Sheets

(51) Int. Cl.
*B65D 33/14* (2006.01)
*B31B 160/10* (2017.01)
*B31B 155/00* (2017.01)
*B29K 23/00* (2006.01)
*B29L 31/00* (2006.01)

(56) References Cited

U.S. PATENT DOCUMENTS

| | | | | |
|---|---|---|---|---|
| 5,184,728 | A * | 2/1993 | Wile | A47F 13/085 |
| | | | | 206/493 |
| 5,335,788 | A * | 8/1994 | Beasley | B65D 33/001 |
| | | | | 206/554 |
| 5,465,845 | A * | 11/1995 | Norby | B65B 43/14 |
| | | | | 206/554 |
| 6,435,350 | B1 * | 8/2002 | Huang | B26D 3/12 |
| | | | | 206/554 |
| 6,478,156 | B1 * | 11/2002 | Gebhardt | B65D 33/001 |
| | | | | 206/554 |
| 6,655,546 | B1 * | 12/2003 | Bolton | B65D 33/001 |
| | | | | 206/554 |
| 8,534,462 | B1 * | 9/2013 | Tan | B65D 83/0847 |
| | | | | 206/554 |
| 2005/0252819 | A1 * | 11/2005 | Chum | B65D 83/0847 |
| | | | | 206/554 |
| 2007/0108088 | A1 * | 5/2007 | Hinley, Jr. | A61B 50/36 |
| | | | | 206/554 |
| 2008/0257778 | A1 * | 10/2008 | Dickinson | B65D 33/001 |
| | | | | 206/554 |

* cited by examiner

METHOD OF MANUFACTURING HEADERLESS PRODUCE BAGS WITH INCREASED ADHESION

RELATED APPLICATION DATA

This is a divisional application of U.S. Ser. No. 14/872,871, titled METHOD OF MANUFACTURING HEADERLESS PRODUCE BAGS WITH INCREASED ADHESION, filed Oct. 1, 2015, the entire disclosure of which is hereby incorporated by reference herein.

BACKGROUND OF THE INVENTION

1. Field of the Invention

The present invention relates to plastic produce bags and more particularly to a method of manufacturing headerless plastic produce bags with increased surface adhesion for easy opening as the bags are removed from a rack, and to plastic bags manufactured by that method.

2. Description of Prior Art Including Information Disclosed Under 37 CFR 1.97 and 1.98

Plastic bags formed of thin sheets of polyethylene or polypropylene designed for packaging produce and other food items are well known in the art. The bags have sealed side edges and bottoms to form a package into which the produce can be situated. The tops of the bags remain unsealed to form a mouth which can be opened to permit insertion of the contents into the bags.

The bags are manufactured in groups or stacks using high speed manufacturing equipment. Openings are created in the bags during the manufacturing process to enable the bags to be easily suspended from the support rods of a dispenser rack.

The plastic sheets from which the bags are formed do not normally adhere to each other. Thus the mouth of each bag on the rack must be opened manually by the user to insert the contents after the bag is removed from the rack.

Further, the plastic sheets which form the bags have chemically inert and nonporous surfaces with low surface tensions. Unless treated, the surfaces are not receptive to bonding with inks or coatings.

It is known to enhance the ability of a plastic surface to bond with ink or other coatings by treating the plastic surface to increase the magnitude of the energy or electric charge on the surface. The surface charge can be increased by exposing the surface to low temperature corona discharge plasma. The exterior surface of plastic sheets which form which plastic bags are made have been subjected to such treatments to enhance the ability of the sheets to bond with ink or other coatings.

However, to the extent that such treatments have been used on plastic sheets which form plastic produce bags to enhance the bonding ability of the surfaces to bond with ink or other coatings, the treatments have not increased the magnitude of electric charge on the plastic sheet surfaces to a level where adjacent bags adhere to each other with sufficient force that the movement of one bag away from the next bag on the rack will cause the mouth of the next bag to open automatically. Thus, even bags treated to increase the surface charge in order to enhance the ability to bond with ink or other coatings must still be individually manually opened by the user after they are removed from the rack before inserting the contents.

Produce bags with plastic headers which include zipper-like closure devices, commonly referred to as "deli bags" are well known. Such bags are relatively expensive to manufacture because of the additional materials required, the increased number of manufacturing steps necessary to form the header and the additional cost of fabricating and assembling the zipper closure.

Deli bags can be supplied in a stack with one or more openings in the header designed to receive the support rods of a rack. Alternatively, the deli bags can be supplied in end-to-end relation in rolls with perforations between the individual bags. The roll is mounted on a hollow core which is received on a spindle of a bag dispenser. The bags can be removed one at a time from the roll by separating the first bag from the next bag along the perforation line therebetween. Like the bags hanging in face-to-face relation from a rack, each bag must be individually manually opened after it is removed from the roll.

The requirement that each plastic bag be manually opened causes many of the bags to be wasted because the bags cannot be opened easily. For that reason, many are discarded and end up on the floor. Aside from wasting bags, which increases the costs to the retail establishment, having unused bags accumulating on the floor around the location where the bags are dispensed can be dangerous because it creates a potential slip and fall hazard.

Further, customers will often try to open the bags by moistening their fingers to increase the adhesion between their fingers and the plastic sheets that form the bags. That creates an unsanitary condition with the potential for passing disease from one customer to another.

The roll-type dispensing system also has the drawback of not allowing additional bags to be added onto the dispenser until the all of the bags in the roll have been used and the core is removed from the dispenser spindle.

It is, therefore, a prime object of the present invention to provide a method of manufacturing headerless produce bags with increased adhesion between the surfaces of the bags.

It is another object of the present invention to provide a method of manufacturing headerless produce bags wherein the increased adhesion between the bags causes the removal of one bag to automatically open the mouth of the next bag on the rack.

It is another object of the present invention to provide a method of manufacturing headerless produce bags wherein the increased adhesion is a result of a relatively high level of surface charge.

It is another object of the present invention to provide a method of manufacturing headerless produce bags with increased adhesion wherein the level of surface charge is increased by treating the bags with low temperature corona discharge plasma.

It is another object of the present invention to provide a method of manufacturing headerless produce bags with increased adhesion wherein a recess is formed in the bags to further increase the adhesion between the bags.

It is another object of the present invention to provide a method of manufacturing headerless produce bags with increased adhesion at decreased cost by reducing the amount of material and the number of assembly steps by eliminating the necessity for headers and closure devices.

It is another object of the present invention to provide a method of manufacturing headerless produce bags with increased adhesion wherein the bags are provided without headers or cores which require disposal.

It is another object of the present invention to provide a method of manufacturing headerless produce bags with increased adhesion wherein the number of bags that are wasted because they could not be opened easily is greatly reduced.

It is another object of the present invention to provide a method of manufacturing headerless produce bags with increased adhesion wherein additional bags can be added to a rack without waiting until all the bags on the rack have been removed.

BRIEF SUMMARY OF THE INVENTION

Those objects and such other objects which may hereinafter appear are achieved by the present invention which relates to a method for manufacturing a plastic bag from sheets of plastic film by exposing at least one exterior surface of the plastic bag to low temperature corona discharge plasma to increase the surface charge magnitude thereof to at least 43 Dyne and by forming at least one recess in the plastic bag.

The method further includes forming a second plastic bag with a mouth and aligning the treated bag and the second bag such that the exterior surface of the treated bag adheres to the second bag with sufficient force to automatically open the mouth of the second bag, as the treated bag is moved relative to the second bag.

Preferably, a recess in the second bag is formed at the same time as the recess in the treated bag.

The method also includes creating an opening in the treated bag. The opening is adapted to receive a support rod of a bag dispenser rack. Preferably, the opening is created at the same time that the recess is formed.

The method further includes treating the exterior surface of the second plastic bag with low temperature corona discharge plasma to increase the surface charge magnitude thereof. The surface charge magnitude of the exterior surface of the second plastic bag is increased to the level of at least 43 Dyne.

The recess is preferably substantially rounded in shape. More than one recess can be created in each bag. The number of recesses to be created is based upon the size of the bag. The number of recesses to be formed increases as the size of the bag becomes larger.

In accordance with another object of the present invention, a method of increasing the adhesion between the exterior surfaces of first and second plastic bags is provided. The bags are formed from sheets of plastic film. One of the bags is treated by exposing the exterior surface thereof to low temperature corona discharge plasma to increase the surface charge magnitude to at least 43 Dyne. A recess is created in each of the bags. The bags are aligned such that the exterior surface of the first bag is adjacent the surface of the second bag. The adhesion force between the exterior surfaces of first and second plastic bags is increased by the plasma treatment and recess such that the exterior surface of the first bag adheres to the second bag with sufficient force to automatically open the mouth of the second bag, as the first bag is moved relative to the second bag.

The method further includes the steps of treating the second bag by exposing the exterior surface of the second bag with low temperature corona discharge plasma to increase the surface charge magnitude thereof. The surface charge magnitude of the exterior surface of the second bag is increased to at least 43 Dyne.

The recesses created in the bags are aligned and are preferably substantially round in shape. More than one recess may be created in each bag. The number of recesses to be created is based upon the size of the bags. The number of recesses increases as the size of the bags becomes larger.

The method also includes forming an opening in each of the bags to accept the support rod of a bag dispensing rack. Preferably, the recesses are created at the same time as the openings are formed and the recesses and openings are the formed in the same manufacturing operation.

In accordance with another aspect of the present invention, a produce bag is provided including first and second plastic sheets joined at the sides and bottom to form a compartment adapted to receive a product. One of the plastic sheets has an exterior surface with a surface charge magnitude of at least 43 Dyne. At least one of the sheets has a recess.

The bag may have simple edge sides or gusseted sides.

A dispenser may be provided for use with the bag. The dispenser has a pouch adapted to receive and support the lower portion of the bag.

In accordance with another aspect of the present invention, first and a second aligned produce bags are provided. Each of the bags includes first and second plastic sheets joined at the sides and bottom to form a compartment with an unsealed mouth adapted to receive a product. The first plastic bag has an exterior surface with a surface charge magnitude of at least 43 Dyne. That exterior surface is adjacent the second plastic bag. Each of the bags has a recess. The exterior surface of the first bag adheres to the second bag with sufficient force to automatically open the mouth of the second bag as the first bag is moved away from the second bag.

A dispenser may be provided for use with the bags. The dispenser includes a pouch adapted to receive and support the lower portion of the bags.

BRIEF DESCRIPTION OF THE SEVERAL VIEWS OF DRAWINGS

To these and to such other objects that may hereinafter appears, the present invention relates to a method of manufacturing a headerless plastic bag with increased adhesion as described in detail in the following specification and recited in the annexed claims, taken together with the accompanying drawings, in which like numerals refer to like parts and in which:

DETAILED DESCRIPTION OF THE INVENTION

Figure 1:
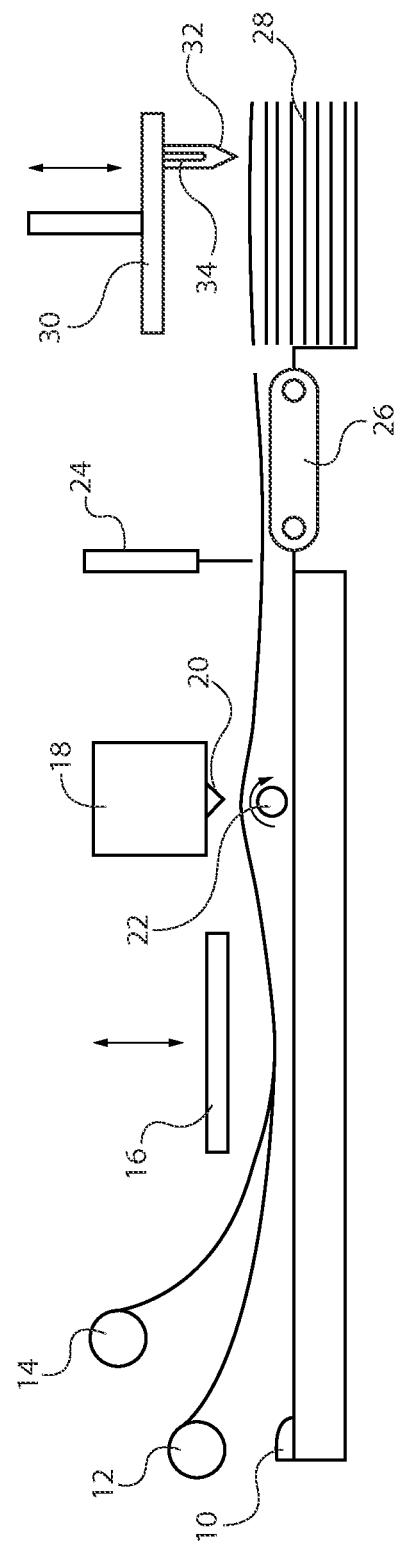
FIG. 1 is an idealized side view of a production line for fabricating the bags of the present invention.

FIG. 1 schematically illustrates the steps in the manufacturing process of the present invention. Above a work surface 10 are located feed rollers 12 and 14. Each of the rollers 12, 14 dispenses a continuous sheet of thin plastic material such as polyethylene or polypropylene film. The plastic sheets from the rollers are positioned one on top of another above work surface 10 such that the sheets are aligned.

The aligned sheets pass into a bag forming station which includes a platen 16 containing heating elements. Platen 16 is reciprocated vertically such that it presses the aligned sheets and heat seals the edges and bottom of what will become each plastic bag, generally designated A. The portion of the aligned sheets which will become the top or mouth of the bag is not sealed.

The bag forming process is conventional and is therefore not illustrated in detail in the figure. Bags A with either simple side edges (illustrated in FIG. 2) or with gusseted sides A' (shown in FIG. 5) can be formed by this process, as is well known to those of ordinary skill in the art.

After leaving the bag forming station, the plastic sheets move to the plasma treatment station where the exterior surface of the top plastic sheet is exposed to low temperature corona discharge plasma to create a surface charge magnitude of at least 43 Dyne. This station includes corona discharge plasma treatment equipment 18 in the form of a high-frequency power generator and a high-voltage transformer. Extending downwardly from equipment 18 is a linear array of sharp tipped stationary ceramic or metal electrodes 20. The electrodes of the array are spaced alone a direction generally perpendicular to the direction of movement of the aligned sheets so as to form a charged region through which the bags pass. A grounded roller 22 is situated under the bags, spaced from and aligned with the electrodes.

The corona discharge plasma is generated by the application of high voltage to the sharp tips of electrodes 20 which forms plasma at the ends of the electrodes. Spacing the electrodes in a linear array creates a uniform curtain of corona discharge plasma across the sheets which form the bags. As the plastic sheets pass through the air gap between electrodes 18 and the grounded roller 22, the plasma imparts changes in the properties of the exposed plastic surface by increasing the surface energy of the material.

Although not illustrated in the drawing, it is possible to include a second plasma treatment station, with the electrodes situated below the aligned plastic sheets and the grounded roll above the sheets, so as to treat the exterior surface of the bottom plastic sheet in addition to or instead of the exterior surface of the top plastic sheet. Accordingly, either or both of the exterior surfaces of the aligned plastic sheets of the bags can be treated.

The treated bags then pass into the cutting station. The cutting station includes a reciprocating knife 24 which cuts the sealed and treated sheets at appropriate locations to separate the individual bags A. The bags then exit the work surface and are moved by a conveyor 26 to a stacking station where the bags accumulate into a pile or stack 28 on a platform at the end of the production line.

On the platform, stack 28 is situated below a second reciprocating platen 30. The undersurface of platen 30 includes one or more sharp-tipped tools 32 aligned with the upper section of the bags. Tools 32 create aligned openings 36 in all of the bags in the stack. As many tools 32 are required as the number of openings 36 that are necessary. In the drawings, two spaced opening 36 in the upper section of the bags are provided to receive the two support rods of a dispensing rack.

Figure 2:
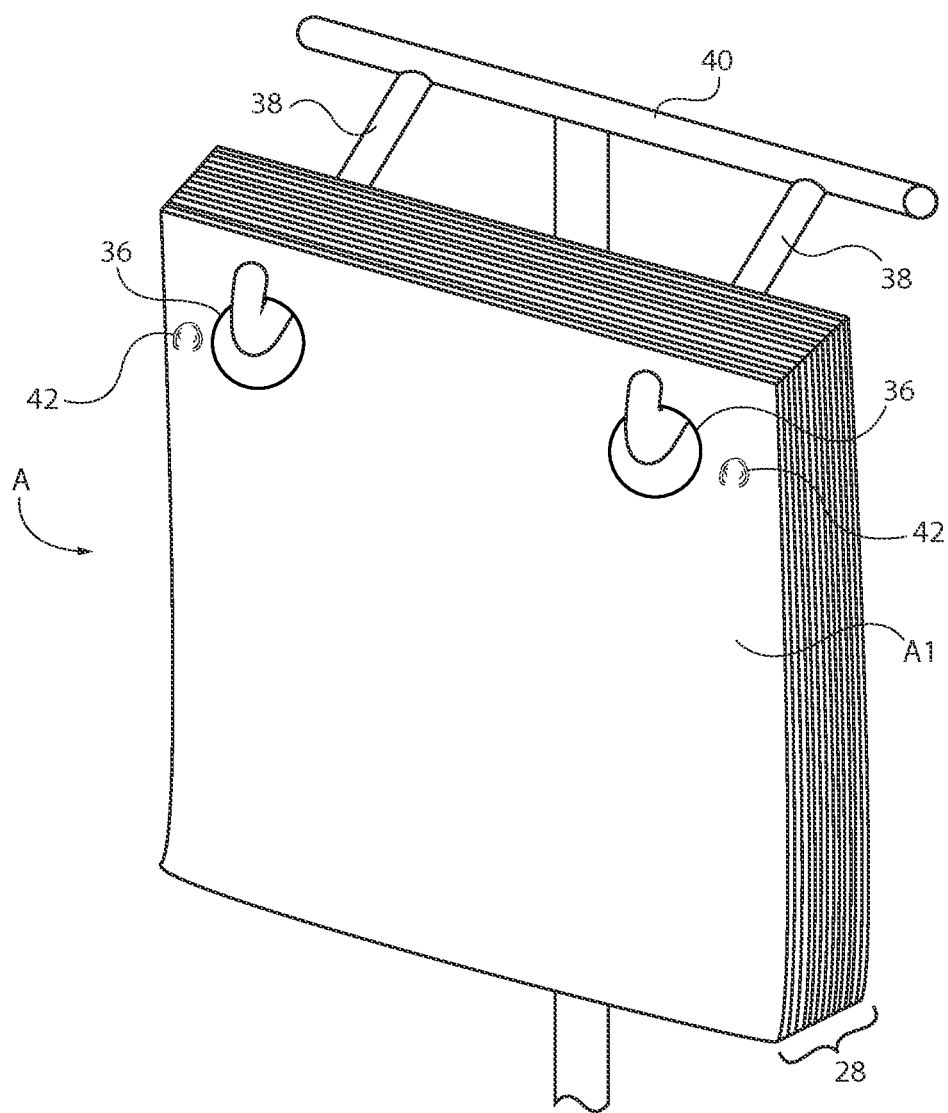
FIG. 2 is a perspective view of a plurality of plastic bags fabricated in accordance with method of the present invention as they would appear suspended from a rack.

Platen 30 also has one or more blunt-tipped tools 34 which are shorter and smaller in diameter than tools 32. Tools 34 create one or more sets of aligned rounded recesses 42 in all of the bags in the stack. In the drawings tools, two recesses are formed, one recess As seen in FIG. 1, tools 32 and 34 are aligned such that the holes 42 and recesses 42 are situated Each tool 32 punches aligned openings 36 in the all of the bags of the stack each time the platen is moved downwardly. One or more sets of openings 36 can be created at a time. Openings 36 are adapted to receive the support rods 38 of a bag rack 40 such that the stack of bags hang in face-to-face relation from the rack, as illustrated in FIG. 2. The number of openings formed depends upon the number of support rods of the rack on which the bags will be hung. Typically, at least two spaced openings designed to accept two support rods are provided in each bag.

Tools 34 are provided with blunt ends such that they create aligned recesses or "dimples" 42 in all of the bags in the stack at the same time as platen 30 is pressed into the stack of bags. The blunt ends of the tools 34 are configured such that the bags are not pierced. No openings in the bags are created by this tool, only recesses. As many different tools 34 are provided as the number of recesses which are required in each bag. The number of recesses required is a function of the size of the bags being produced. The larger the bag, the more recesses that are required. The purpose of the recesses 42 is to further increase the adhesion between to bags beyond that which is imparted by the corona discharge plasma treatment.

The completed stacks of bags 28 are the packaged and shipped to retail establishments. At the retail establishment, the stack of bags A is mounted on a rack 40 by inserting the support rods 38 through openings 36 in the bags, as seen in FIG. 2. Rack 40 may be a floor standing rack or may be designed to rest on a counter.

Figure 3:
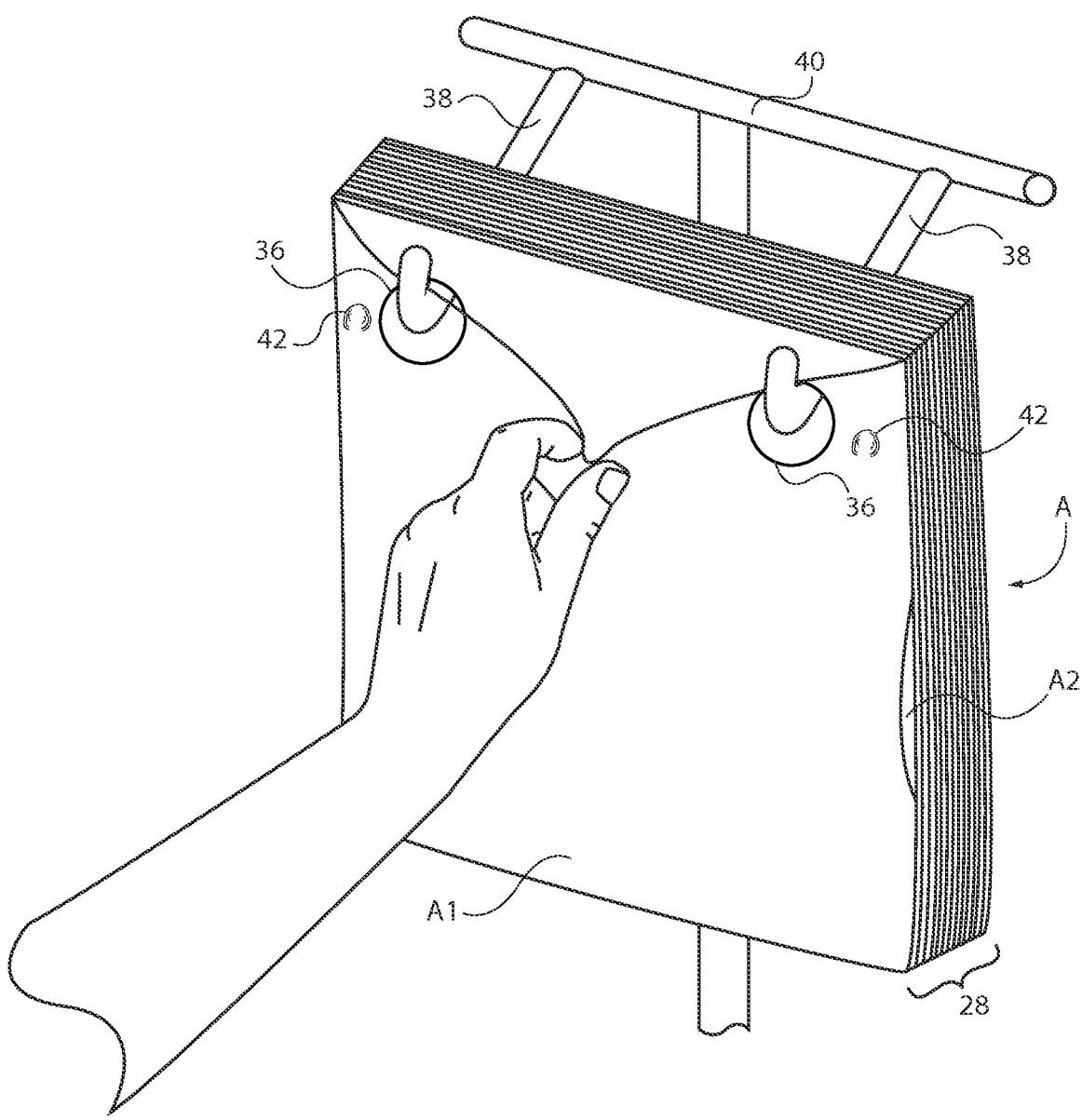
FIG. 3 is a perspective view similar to FIG. 2 showing the first bags being removed from the rack.
Figure 4:
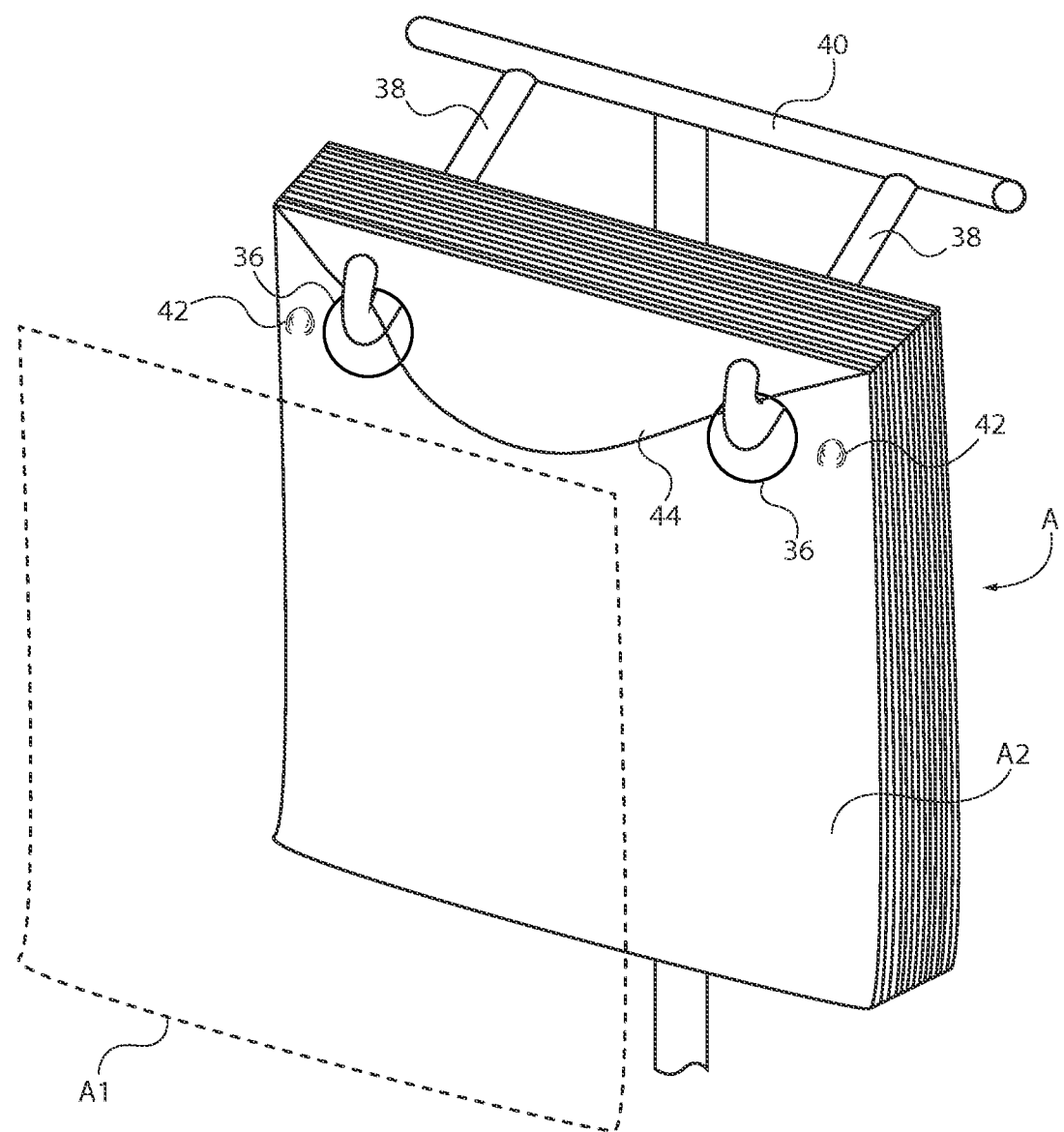
FIG. 4 is a perspective view similar to FIG. 3 showing that the mouth second bag automatically opens as the first bag is removed from the rack.

As the first bag A1 of the stack 28 is being removed from the rack (FIG. 3), the mouth 44 of the next bag A2 on the rack is automatically opened due to the adhesion between the exterior surface of the first bag and the exterior surface of the second bag (FIG. 4), one or both of which exterior surfaces having been treated with the corona plasma discharge.

Once suspended from the rack, the bags can be easily removed from the rack, one at a time, for use in packaging produce or other food products. Removal of one bag automatically opens the mouth of the succeeding bag because of the adhesion forces between the bags, making the use of the bags easy and dramatically decreasing the amount of bags which are wasted.

Figure 5:
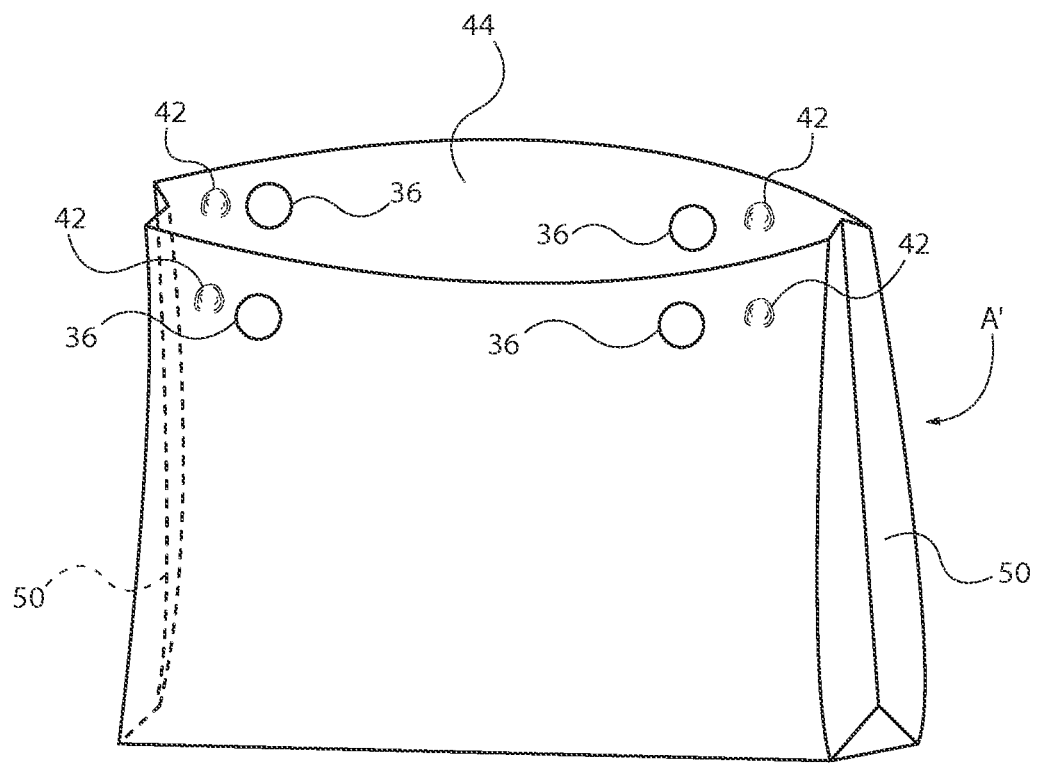
FIG. 5 is a perspective view of a side-gusseted plastic bag fabricated in accordance with the present invention.

FIG. 5 illustrates a bag A' fabricated with the process of the present invention which is essentially the same as bag A except for the gusseted sides 50. Bag A' can be formed and treated by the same equipment and process disclosed above except that the gusseted sides are formed by an additional folding processes known in the art. The bags A' function in the same manner as the simple edge sided bags A in the sense that the adherence between adjacent bags causes the mouth of the second bag to automatically open as the first bag is removed from the rack.

Figure 6:
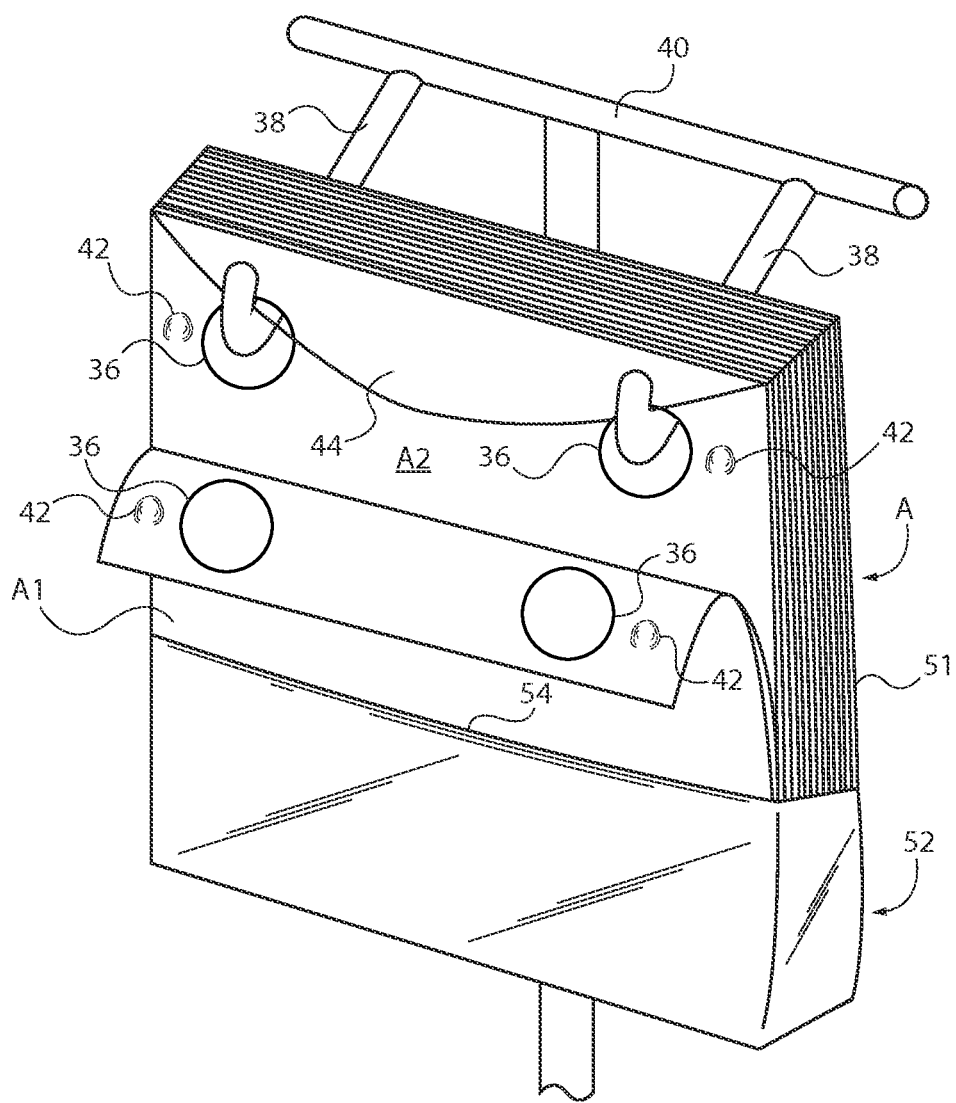
FIG. 6 is a perspective view of a plurality of plastic bags fabricated in accordance with the present invention and situated in a bag dispenser having a pouch or pocket.

FIG. 6 illustrates a dispenser, generally designated B, which includes a pouch or pocket 52 with an open mouth 54. The lower portions of the bags are received in and supported by the pouch.

Dispenser B is formed of a back 51 and a pouch or pocket 52. The dispenser is made of paper or plastic material which is somewhat more ridged than that of the bags. The dispenser and stack of bags is provided with an exterior wrapper surrounding it can form a package in which the bags can be shipped. When the package is received by the retail establishment, the exterior wrapper is removed and the package hung on a rack 40 as illustrated in FIG. 6.

Pouch or pocket 52 supports the lower portions of the bags in a pouch and reduces the number of bags which are wasted and end up on the floor. This dispenser is the subject of U.S. Pat. No. 7,314,137, which describes the structure and function of dispenser B in greater detail. In this embodiment, as with the bags which hang freely from the rack, the mouth 44 of the next bag A2 in the stack is opened automatically as the first bag A1 in the stack is removed from the dispenser because of the adhesion forces between the adjacent bags.

The bags may be formed with one or more than one recess 42 as needed. FIG. 6 shows two recesses 42. However the number of recesses depends upon the size of the bag. Larger bags are provided with additional recesses to further increase the adhesion forces between the bags.

It will now be appreciated that the present invention relates to a method for manufacturing plastic bags from sheets of plastic film in which a first bag having an exterior surface is formed and a second bag having an exterior surface is formed. An exterior surface of one or both of the bags is treated by exposing the surface to low temperature corona discharge plasma. The bags are aligned, for example being hung from a rack, such that the treated surface of one bag faces the exterior surface of the second bag.

The exterior surface of one or both of the bags is treated to have a surface charge magnitude of at least 43 Dyne. The surface treatment increases the adhesion between the bag surfaces. Aligned recess are created in the bags. The recesses further increase the adhesion forces between the bags. The adhesion forces cause the mouth of a next bag in the stack to automatically open as the first bag is moved away relative to the next bag, such as being removed from a rack.

The number of aligned recesses to be created in the aligned plastic bags is based upon the size of the bag. The number of aligned recesses necessary increases as the size of the plastic bags becomes larger. Preferably, the recesses have a substantially round shape.

Preferably, the aligned recesses in the bags are created at the same time and by the same tool as the rod receiving openings.

The invention also relates to a headerless produce bag formed of first and second plastic sheets joined at the sides and bottom to create a compartment adapted to receive a product. At least one of the plastic sheets has an exterior surface with a surface charge magnitude of at least 43 Dyne. A least one of the sheets has a recess. The bags may have a simple edge side or have a side gusset. Further, the bags may be packaged within a dispenser having a pouch or pocket adapted to receive and support the lower portions of the bags.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. A headerless plastic bag, comprising:
   a first sheet;
   a second sheet aligned in facing relation to the first sheet and heat sealed to the first sheet to form the plastic bag, wherein the first sheet comprising an exterior surface with a surface charge magnitude of at least 43;
   a first pair of mated recesses disposed in the first sheet and the second sheet, the first pair of mated recesses configured to cause the first sheet to releasably mechanically adhere to the second sheet, whereby an adherence between the first sheet and the second sheet caused by the pair of recesses, and the adherence caused by the plasma treatment together cause the plastic bag to automatically open upon separation of the plastic bag from a second plastic bag, the first sheet defining a first pair of holes disposed at a top edge of the bag, and the second sheet defining a second pair of holes disposed at the top edge of the bag in facing relation to the first pair of holes, the first pair of mated recesses disposed only at positions interposing the first or second pair of holes and a first side edge of the bag or a second side edge of the bag, the separation localized at points interposing each hole of the first pair of holes of the first sheet, and at points interposing each hole of the second pair of holes of the second sheet.

2. The bag of claim 1 wherein the sides of the bag comprise gussets.

3. A dispenser for use with the bag of claim 1, comprising a pouch adapted to receive and support the lower portion of the bag.

4. A system, comprising:
   a first headerless plastic bag, comprising:
   a first sheet;
   a second sheet aligned in facing relation to the first sheet and heat sealed to the first sheet to form the plastic bag having three heat sealed sides and a mouth, wherein the first sheet comprising an exterior surface with a surface charge magnitude of at least 43 Dyne;
   a first pair of mated recesses disposed in the first sheet and the second sheet, the first pair of mated recesses configured to cause the first sheet to releasably mechanically adhere to the second sheet, the first sheet defining a first pair of holes disposed at a top edge of the bag, and the second sheet defining a second pair of holes disposed at the top edge of the bag, the first pair of mated recesses disposed only at a position interposing the first pair of holes and a first side edge of the bag or a second side edge of the bag; and
   a second headerless plastic bag, comprising:
   a second pair of recesses configured to mate with at least one of the first pair of recesses, whereby an adherence between the first sheet and the second sheet caused by the pair of recesses, and the adherence caused by the plasma treatment together cause the plastic bag to automatically open upon separation of the plastic bag from the second plastic bag.

5. A dispenser for use with the bags of claim 2 comprising a pouch adapted to receive and support the lower portion of the bags.

* * * * *